United States Patent Office 3,244,005
Patented Apr. 5, 1966

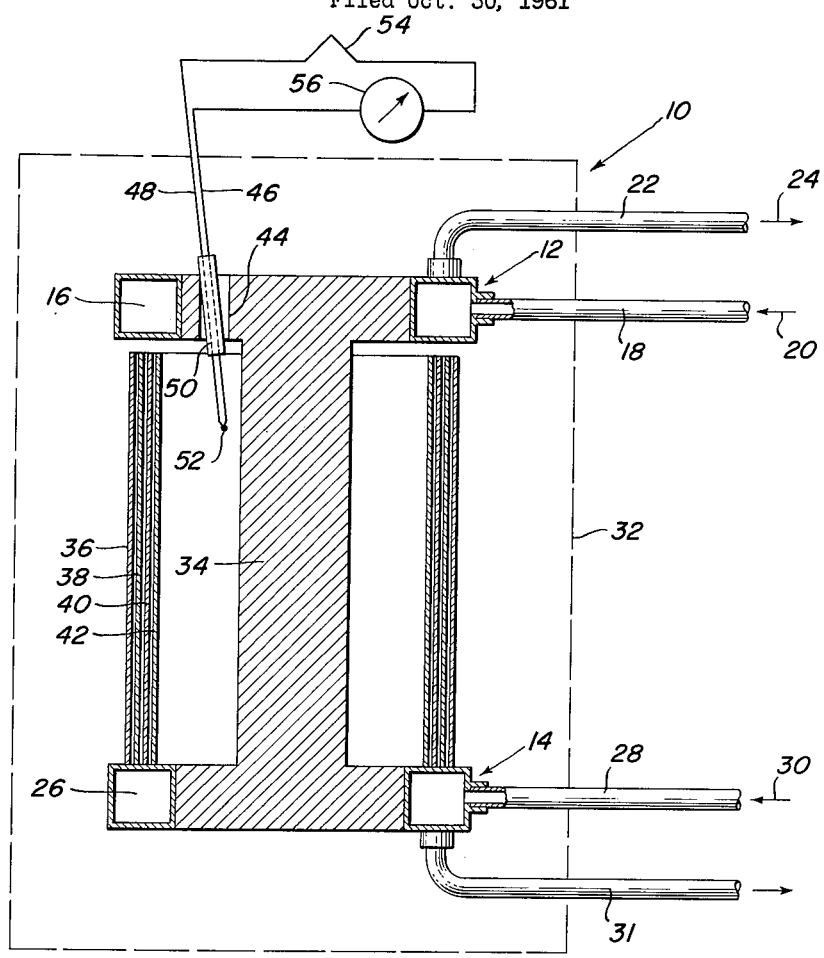
INVENTOR
FREDERICK W. KUETHER
BY
Arthur H. Swanson
ATTORNEY.

3,244,005
TEMPERATURE MEASURING APPARATUS
Frederick W. Kuether, Minneapolis, Minn., assignor to Honeywell Inc., a corporation of Delaware
Filed Oct. 30, 1961, Ser. No. 148,638
3 Claims. (Cl. 73—359)

The present invention concerns itself with an apparatus for rapidly and precisely measuring the temperature of solids, liquids, gases and plasmas which may be heated to very high temperatures.

It is well known that temperature sensing constructions used in the prior art are unsatisfactory in measuring high temperatures because of the tendency for the temperature sensing components to crack, melt, fuse, crystallize and/or other physical alteration, resulting in loss of thermal/E.M.F. stability and other electrical properties.

An object of the present invention is to provide a novel temperature dividing apparatus that employs a temperature responsive element that is not subjected to deterioration or destruction when used to measure temperatures exceeding its stability range. For temperature responsive elements utilizing the thermocouple principle the present invention provides a means of preserving thermal/E.M.F. stability when measuring temperature of environments or objects that are in very high temperature ranges.

More specifically it is still another object of the invention to extend the usefulness of thermocouples made of either platinum/platinum rhodium, iridium/iridium rhodium, tungsten/rhenium, tungsten/tungsten rhenium beyond their normally limited, useful temperature range of measurement into the ultra-high temperature range without incurring any substantial distortion in the thermal/E.M.F. stability in the two metals from which these thermocouples are constructed.

More specifically the present invention discloses a thermocouple of the aforementioned type to measure the ultra-high temperature of a heat emitting source such as an electrode heated, heat emitting object inside either a vacuum or gas-filled electric furnace.

It is another object of the present invention to provide a thermocouple with electrical leads which have a preselected length-diameter ratio in order to very rapidly carry heat flux emitted by an object, whose temperature may extend into the ultra-high temperature range, away from its hot junction and to thereby prevent the hot junction from ever exceeding the upper limit of the stable E.M.F. range of the thermocouple.

It is another object of the invention to provide the aforementioned thermocouple leads with a heat sink to assist the leads in rapidly carrying heat flux away from the object whose temperature is being measured, thereby, keeping the temperature of the parts of the thermocouple below a temperature at which they would crack, melt, fuse, crystallize or be physically distorted in some other manner.

It is another object of the present invention to provide a temperature divider whose temperature sensitive region does not operate in temperature equilibrium with the heat source whose temperature it is employed to measure and thereby affords a very rapid response of the temperature divider to changes in the temperature of the heat source.

A thermocouple, such as platinum/platinum rhodium, cannot be used to measure the temperature of any material over two-thousand seven hundred degrees Fahrenheit because of the erratic unstable thermal/E.M.F. characteristic which the material of such a thermocouple possesses above this temperature due to one or more of the previously mentioned physical changes which take place in the material of which the thermocouple is constructed. Experimentation has shown that the problem can be overcome by altering the length-diameter ratio of the material forming the electrical conductor leads and mass of the hot junction of the thermocouple, so that the heat conducted by the thermocouple leads away from its hot junction to a heat sink and the heat lost through radiation will be substantially equal to the heat flux being absorbed by the hot junction from the heat emitting source. With this thermocouple construction the temperature of the hot junction will thus be kept lower than the temperature of the object or environment being measured and within the stable thermal/E.M.F. temperature operating range of the material, from which the thermocouple is made.

It is thus one of the primary objects of the present invention to employ a thermocouple whose electrical conductors are of a preselected length-diameter ratio and its hot junction is of a desired preselected mass so that these parts can carry the heat of an object or environment under measurement to a heat sink at substantially the same rate at which this thermocouple junction is absorbing heat from the object or environment under measurement.

In the drawing:

The drawing shows the aforementioned temperature dividing apparatus employed to measure the temperature of an object in a furnace.

The furnace 10 shown in the drawing is of an electric variety which may be of either a gas-filled or vacuum type that is capable of providing environmental conditions up to about six thousand degrees Fahrenheit.

This furnace is schematically illustrated as comprising an electrically heated fluid-cooled top electrode 12 and fluid-cooled bottom electrode 14. The top electrode 12 is shown as having a passageway 16 for accommodating the flow of a cooling fluid such as cold water or a gas therethrough. This passageway 16 in turn has an inlet conduit 18 through which the cooling fluid from a cooling fluid supply, not shown, flows in the direction of the arrow 20 into the passageway 16.

The right side portion of the passageway 16 has an outlet conduit 22 through which the cooling fluid that has been used to cool the electrode 12 can flow in the direction of the arrow 24 to a water cooling and water recirculating unit, not shown.

The bottom electrode 14 is also shown provided with a water-cooled passageway 26. The passageway 26 has an inlet conduit 28 through which cooling water from a cooling water supply, not shown, flows in the direction of the arrow 30 and an outlet conduit 31 through which water that has been used to cool the electrode 14 flows.

A conventional type electric furnace wall 32 is represented schematically in dash line form surrounding the heating parts of the furnace and a dumbell-shaped heated carbon element 34 extends between the electrically heated electrodes 12, 14.

In order to provide a temperature dividing apparatus for the aforementioned described electric furnace a plurality of radiation shields such as the shields 36, 38, 40 and 42 are spaced circumferentially about the electrode heated carbon element 34 as shown. Each of these shields 36, 38, 40 and 42 are arranged to act as insulating members to prevent furnace heat loss and to thus prevent any excessive amounts of power being used by the furnace. These shields are thus employed to return the heat flux which they receive from the carbon element 34. Of course, it will be appreciated that the heat shields are not necessary to the present invention, but are present only as illustrative of a type of furnace construction wherein power consumption is minimized. The present invention will work equally well without these shields.

An aperture 44 is shown in the upper wall portion of the heated carbon element 34 to accommodate the passage of a pair of heat conducting electrical thermocouple leads 46, 48 therethrough. A suitable high temperature resistant insulating sleeve 50, which may be made of a suitable heat resistant material such as alumina, surrounds each of these electrically conductive thermocouple leads 46, 48 to insulate them from the upper portion of carbon element 34. In the modification shown, the thermocouple junction 52 is located exterior to the heating element 34. However, the junction 52 may also be inserted into a chamber within the heating element proper.

In the preferred modification the electrically conductive leads are of a preselected length-diameter ratio which will enable heat flux which the junction 52 receives from the object or environment being measured to be rapidly conducted away from the hot junction 52 in large quantities at the same rate of speed at which this heat is being absorbed by this junction at a given temperature. For example, if the source is at temperature $T_1$ and the thermocouple is at a lower temperature $T_2$ the leads will be of such a length diameter not as to carry away the heat flux which would normally tend to bring the thermocouple to temperature $T_2$. In this way the hot junction and leads will never exceed the upper limit of the thermal/E.M.F. stability range for which they were constructed.

The lower end of the heat conducting thermocouple leads 46, 48 are joined together at 52 to form a hot junction of the aforementioned thermocouple circuit. The other remaining portions of this circuit are shown in the drawing to include a cold junction 54 and a galvanometer 56 for directly indicating the temperature of the object under measurement.

As previously noted the two materials for this hot junction may consist of either platinum/platinum rhodium, tungsten/rhenium, tungsten/tungsten rhenium, iridium/iridium rhodium or any other combination of material which have equally as good thermal/E.M.F. stability when any one combination of these materials is selected to obtain precise temperature measurement of the carbon heated element.

Although the following description is a typical example of how use can be made of the temperature dividing apparatus disclosed herein to precisely measure the temperature of a heated carbon element 34 of an electric furnace it should be understood that this temperature dividing principle is not limited to this use alone but can be used to advantage to measure the temperature of many other heat emitting sources whose temperature extends into the ultra-high temperature range.

The aforementioned temperature dividing apparatus is arranged to measure the heat flux emitted by the carbon heating element 34 of the electric furnace as illustrated in the drawing. The hot junction 52 of this apparatus is fixedly positioned between the heating element 34 and the inner shield 42.

If the material selected for the hot junction of the thermocouple is e.g. the platinum/platinum rhodium pair previously referred to, the desirable diameter of the platinum and platinum rhodium thermocouple leads 46, 48 selected for the thermocouple can be approximately .010 inch with a length of three to four inches being in a temperature range in excess of about five hundred degrees Fahrenheit.

It has been found that when a thermocouple circuit is constructed for use in a vacuum furnace in which the first of these .010 inch diameter thermocouple leads was made of platinum and another associated lead was made of ninety percent platinum, ten percent rhodium and these leads are fused together at one of their ends into a small ball to form a hot junction, the temperature of these leads at a point whose length L is three inches away from the hot junction will be at a temperature that is always kept lower than the temperature of the object or environment being measured and that the temperature of this hot junction will not exceed 2,600 degrees Fahrenheit despite the existence of radiation from a 3,600 degree Fahrenheit object or environment under measurement. It should also be understood that in certain applications it may be desired to substitute a less costly wire for the remaining length of the platinum and platinum rhodium thermocouple leads for the temperature measuring, upper end, portion of the thermocouple circuit.

A temperature divider having the aforementioned characteristics may thus be constructed of a fine Pt/PtRh thermocouple so that it is thus capable of passing through a large change in temperature. Alternately or simultaneously this large temperature change may be made to exist by cooling the thermocouple leads by means of a heat sink located at some point for example in the region encompassed by the ends of the guide lines associated with reference numerals 48 and 50 of the aforementioned thermocouple circuit.

When the cross section area A of the thermocouple leads are increased because of a necessary increase in L, the lead length extending away from the hot junction previously referred to, the heat input to the hot junction increases because of increased surfaces for accepting radiation and convection heating. For a lead wire of radius $r$ and length L the heat accepted by radiation or convection increases as $2\pi r$ where $r$ is the radius of the thermocouple lead. This heat is conducted away through a cross-sectional area $\pi r^2$ by a temperature gradient $\Delta T/L$. Then for $\Delta T$ to remain fixed, the ratio of $2\pi r$ to $\pi r^2$ $\Delta T/L$ must be fixed, or $r$ must vary as L.

In the case above, had the lead length L been six inches rather than three inches, then $r$ is increased from 0.005 inch (0.010 inch diameter) to 0.010 inch. The ratio of length to diameter, or radius, is thus required to remain substantially fixed. Heat accepted in this case will thus increase as $2\pi r$.

It should be understood that the aforementioned relationship of the mass, length and diameter of the thermocouple are so inter-related with one another that the heat absorbed and the heat lost will be sufficient to prevent the thermocouple hot junction from exceeding its E.M.F. stability point.

When the aforementioned type of thermocouple was positioned in an electric furnace such as shown on the illustration between a heating element 34 and shields 36, 38, 40 and 42 this thermocouple precisely measured the temperature of the heated element 34 even when the heated element temperature reached 3,600 degrees Fahrenheit. This is because the previously described heat carrying away temperature dividing thermocouple arrangement permits the temperature of the hot junction to be kept at a temperature within its stable thermal/E.M.F. temperature range, namely at 2,600 degrees Fahrenheit even when the temperature of the heated element is at 3,600 degrees Fahrenheit. Furthermore, it is also important to note that while the 3,600 degree Fahrenheit temperature of the heated element 34 was being sensed by the hot junction 52 the upper portion of the thermocouple leads 46, 48 which protrude into the furnace were at a radiating temperature of 900 degrees Fahrenheit or a temperature that was approximately 700 degrees above the temperature of the environment immediately surrounding these thermocouple leads.

While the above description has been directed to a use of the leads of the thermocouple as means for removal of absorbed heat it should be understood that this is merely one manner in which this removal may be accomplished. The heat absorbed by the thermocouple junction (or other sensor noted below) may also be removed through use of a separate heat conductor and sink. For example, a rod of appropriate configuration of length and diameter and remotely connected to a heat sink may be placed in contact with the tip of the sensing element—in this case the thermocouple junction—and the rod used as a means of dividing the temperature as has previously been described in regard to the use of the leads of thermocouple proper.

It can thus be seen from the aforementioned description that a temperature dividing apparatus has been disclosed having a temperature transducer, such as a thermocouple, which can be placed into an environment whose temperature is at an appreciably higher ultra-high temperature range and still be made to function in substantially as satisfactory and precise manner as it does when it is used to sense temperature below this ultra-high temperature range. Sufficient heat is removed from the transducer by conduction, convection and/or radiation to maintain the transducer within its operating temperature limits despite the higher environment temperature which surrounds same by selecting for the thermocouple leads a preselected length-diameter ratio. With this thermocouple construction, a portion of the heat emitted by the object 34, and absorbed by junction 52, can be removed from hot junction 52.

Experimentation has shown that the temperature divider disclosed herein is provided with a hot junction that will sense any incremental change occurring in the temperature of the heat emitting source as a smaller, proportional temperature change. The accuracy is actually increased due to operation in the thermal/E.M.F. stability range. Since the temperature sensitive region of the temperature divider does not operate in temperature equilibrium with the heat source 34 the response of the temperature divider to changes in the heat source temperature is very rapid.

It is also important to note that for a given temperature sensor mass it now becomes possible for the first time to obtain precise high temperature measurements and/or incremental temperature changes because of the previously mentioned unique way of inter-relating the mass length and diameter of the thermocouple so that it will, under all environmental temperature conditions, remain within its thermal E.M.F. stability range.

It should be understood that other types of temperature sensing elements, such as resistance thermometers, thermistors, or other types of sensors can also be constructed in a manner similar to that previously described for thermocouples in order to extend the usefulness of these temperature measuring means into much higher temperature measuring ranges than has heretofore been possible with commercially available devices.

This can be accomplished by constructing the thermometer or thermistor so that large quantities of heat will be conducted away from the temperature sensor to a heat sink at the same rate at which the sensor receives the heat emitted from the heat source whose temperature is being measured.

The heat flow rates to and away from these temperature sensors to a heat sink will be of such a magnitude that the temperature of the sensor will be within the thermal stability range of these sensors but always less than that of the temperature of the heat source under measurement.

The temperature divider is thus arranged to depress the thermocouple temperature below the environmental temperature that immediately surrounds the thermocouple, thereby, extending the usefulness of the temperature transducer to the ultra-high temperature range of measurement.

The temperature dividing apparatus disclosed herein further allows a temperature transducer to measure temperatures which are appreciably higher than the upper temperature limit which the transducer can withstand without melting, fusing, crystallizing or cracking and still be able to maintain its thermal/E.M.F. stability and a frequency response so that precise temperature measurement can be attained.

Although all of the foregoing discussion has been directed to a temperature dividing apparatus wherein the sensor is maintained at a temperature lower than the temperature being measured and thus, the sensor's capability of temperature measurement is extended to temperatures above its own thermal stability range; it should be readily apparent that the converse situation can also utilize the same principle.

In the measurement of very low temperatures—near 0° K.—the best available resistance thermometers are not reliable below about 1.2° K. The range of these thermometers can be extended by utilizing the source to be measured as a heat sink and the sensor as a heat source. By conducting heat from an external source through the sensor and into the system to be measured, the sensor can be maintained at a temperature above, but proportional to that of the system whose temperature is being measured.

What is claimed is:

1. A temperature dividing apparatus substantially instantaneously to measure the temperature of a heat emitting source positioned within an inclosure, comprising a temperature responsive sensor formed of a preselected mass of heat-conducting material adapted for positioning within said inclosure and in proximate location to said source, a heat sink member, a pair of extensible thermocouple leads adapted to be positioned within the inclosure and forming a thermal conducting connection between the sensor and the sink member, each of said leads having a length to diameter ratio such that they are capable of conducting heat away from said sensor at the same rate at which the heat is being absorbed from the source by the sensor and said rate being of a magnitude necessary to maintain said sensor at a temperature below that of said source, proportional thereto, and within the thermal/E.M.F. stability range of said sensor.

2. A temperature dividing apparatus substantially instantaneously to measure the temperature of a heat emitting source comprising a thermocouple circuit having a hot junction juxtapositioned with respect to said source, an indicator to directly indicate the magnitude of the electromotive force in said circuit, a heat sink member in thermal conducting relationship to said hot junction, said leads of the heat sink member having a length to diameter ratio such that they are capable of conducting heat away from said thermocouple at the same rate at which heat is being absorbed from said source by the hot junction of the thermocouple, and the rate being of a magnitude necessary to maintain said thermocouple at a temperature below that of said source, proportional thereto, and within the thermal/E.M.F. stability point of said sensor.

3. A temperature dividing apparatus substantially instantaneously to measure the temperature of a source comprising a temperature responsive sensor in proximate location to said source, a heat sink member, a pair of extensible thermocouple leads connected at one end in thermal conducting relationship to said sensor and at their other end in heat-transferring relationship with the heat sink, said sensor being of a selected mass and the length to diameter ratio of the leads being of preselected dimensions such that the heat sink is capable of rapidly conducting heat to or carrying heat away from said sensor at a rate necessary to maintain said sensor within its thermal/E.M.F. stability range and in a predetermined temperature relationship with that of said source thereby providing an output signal from said sensor which is proportional to the temperature of said source.

References Cited by the Examiner

UNITED STATES PATENTS

| | | | |
|---|---|---|---|
| 721,770 | 3/1903 | Zeleny | 73—361 |
| 764,175 | 7/1904 | Bristol | 73—357 |
| 2,681,573 | 6/1954 | Brown | 73—341 |

OTHER REFERENCES

Bennett: Noble Metal Thermocouples, Johnson, Mattmey & Co., Limited, February 1956, pp. 17–26.

DAVID SCHONBERG, *Primary Examiner.*

ISAAC LISANN, LOUIS R. PRINCE, *Examiners.*

STEVEN H. BAZERMAN, *Assistant Examiner.*